United States Patent
Pascual et al.

(10) Patent No.: US 10,294,632 B2
(45) Date of Patent: May 21, 2019

(54) BEARING INSERT FOR A BEARING ARRANGEMENT

(71) Applicant: Caterpillar Inc., Peoria, IL (US)

(72) Inventors: Eugene Alarilla Pascual, Dunlap, IL (US); David J. Yanska, Peoria, IL (US); Matthew Ryan Swank, Washington, IL (US); Chad M. Arnold, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 333 days.

(21) Appl. No.: 15/167,172

(22) Filed: May 27, 2016

(65) Prior Publication Data

US 2017/0342681 A1 Nov. 30, 2017

(51) Int. Cl.
*F16C 11/00* (2006.01)
*E02F 9/00* (2006.01)
*F16C 11/06* (2006.01)
*E02F 3/76* (2006.01)

(52) U.S. Cl.
CPC ............ *E02F 9/006* (2013.01); *E02F 3/7618* (2013.01); *F16C 11/0614* (2013.01); *F16C 11/0695* (2013.01); *F16C 2237/00* (2013.01); *Y10T 403/32737* (2015.01)

(58) Field of Classification Search
CPC ..... E02F 9/006; E02F 3/7618; F16C 11/0614; F16C 17/10; F16C 2326/05; F16C 17/022; F16C 23/045; F16C 2237/00; F16C 11/0695; Y10T 403/32737
USPC ......................................................... 384/294
See application file for complete search history.

(56) References Cited

U.S. PATENT DOCUMENTS

| | | | | |
|---|---|---|---|---|
| 3,522,976 A | * | 8/1970 | Spyra | F16C 23/045 384/209 |
| 3,535,006 A | * | 10/1970 | Hudacko | F16C 11/0614 384/206 |
| 3,627,389 A | * | 12/1971 | Foote, Jr. | F16C 23/045 384/208 |
| 3,922,040 A | | 11/1975 | Carter | |
| 3,964,803 A | | 6/1976 | Eftefield et al. | |
| 4,080,015 A | * | 3/1978 | Greby | F16C 23/045 277/507 |
| 4,286,674 A | | 9/1981 | Noble et al. | |

(Continued)

FOREIGN PATENT DOCUMENTS

| | | | |
|---|---|---|---|
| CN | 201857623 U | 6/2011 | |
| FR | 1453658 A | * 6/1966 | ............ E02F 3/7618 |

*Primary Examiner* — Matthew R McMahon
(74) *Attorney, Agent, or Firm* — Miller, Matthias & Hull

(57) ABSTRACT

A replaceable bearing insert may include a bearing surface including a curvature configured to be complementarily contoured to a trunnion ball. The bearing surface may be configured to be in confronting engagement with the trunnion ball. An outer surface opposite the bearing surface may be configured to be received in confronting engagement with an inner surface of an adapter. A first semi-annular flange may extend radially outwardly beyond the outer surface. A second semi-annular flange may extend radially outwardly beyond the outer surface. The first semi-annular flange and the second semi-annular flange may be configured to extend along a first side and a second side of the adapter, respectively, such that the inner surface of the adapter is positioned between the first semi-annular flange and the second semi-annular flange.

19 Claims, 3 Drawing Sheets

(56) References Cited

U.S. PATENT DOCUMENTS

| | | | | |
|---|---|---|---|---|
| 4,845,817 | A | * | 7/1989 | Wilgus .................. B23P 15/003 29/898.054 |
| 5,398,294 | A | * | 3/1995 | Narkon ................. F16C 13/006 384/280 |
| 6,227,709 | B1 | * | 5/2001 | Lehmann ................. F16C 9/04 384/294 |
| 6,345,926 | B1 | | 2/2002 | Farnam et al. |
| 7,229,699 | B2 | * | 6/2007 | Toth .......................... C23C 4/02 29/898.12 |
| 7,465,099 | B2 | * | 12/2008 | Connell ................. A01B 63/16 384/275 |
| 8,127,451 | B1 | * | 3/2012 | Darst ...................... F16C 17/10 29/458 |
| 8,500,334 | B2 | * | 8/2013 | Issler ....................... F16C 9/02 384/288 |
| 9,856,908 | B2 | * | 1/2018 | Tanaka ..................... F16C 9/02 |
| 2007/0081748 | A1 | * | 4/2007 | Sitter ....................... F16C 9/02 384/294 |

* cited by examiner

BEARING INSERT FOR A BEARING ARRANGEMENT

TECHNICAL FIELD

The present disclosure relates generally to bearing arrangements for an earth-moving machine and, more particularly, relates to a bearing insert for such bearing arrangements.

BACKGROUND

Many earth-moving machines in the mining, construction, and agricultural industries include a working implement, such as a blade, carried by a pair of push arms that are pivotally mounted to the machine. Traditionally, a one-piece bearing is welded to a push arm and a bearing cap may be bolted to the one-piece bearing in such a manner that the one-piece bearing pivots on a trunnion ball mounted to the machine. As the bearing is subjected to heavy loads, over time it may experience significant wear and may need to be replaced. With some current arrangements, however, replacement often involves the labor intensive steps of cutting off the old bearing from the push arm and welding a new bearing in place.

In some recent efforts, a bearing insert has been implemented instead of the one-piecing bearing to reduce the time and labor involved in replacing the one-piecing bearing. In such arrangements, the bearing insert may fit into a carriage bracket attached to the push arm and the bearing cap may be bolted to the carriage bracket so that the bearing insert is pivotable on the trunnion ball. After a period of time, debris and corrosion may seize the bearing insert into the carriage bracket, which may present difficulties when attempting to extract the bearing insert from the carriage bracket for replacement.

Chinese Patent Publication No. 201857623U (the '623U publication) discloses a connecting structure of a bulldozer. The connecting structure of the '623U publication includes a carriage bracket and a bush bearing that is pressed into the carriage bracket. With the carriage bracket and bush bearing positioned around a ball joint of the bulldozer, a bearing cap is bolted to the carriage bracket in such a manner that the bush bearing is pressed between the carriage bracket and the ball joint. While effective, the connecting structure of the '623U publication provides a bush bearing pressed into the carriage bracket such that the bush bearing may be seized in the carriage bracket after a period of time.

SUMMARY

In accordance with an aspect of the disclosure, a bearing arrangement for pivotally supporting a push arm assembly with respect to a trunnion ball of a machine is provided. The bearing arrangement may include an adapter including an inner surface. The adapter may be configured to be coupled to a bearing cap such that the coupled adapter and bearing cap substantially surround the trunnion ball. A bearing insert may include a bearing surface, an outer surface opposite the bearing surface, and a pair of flanges. The outer surface may be disposed between the flanges. The bearing insert may be configured to be received by the adapter such that the bearing surface is in confronting engagement with the trunnion ball, the outer surface is in confronting engagement with the inner surface of the adapter, and the inner surface of the adapter is positioned between the flanges.

In accordance with another aspect of the disclosure, an earth-moving machine is provided. The machine may include a track roller frame with a support plate coupled thereto. A trunnion ball may be coupled to the support plate. A bearing insert may include a bearing surface, an outer surface opposite the bearing surface, and a pair of flanges. The outer surface may be disposed between the flanges. The bearing surface may be in confronting engagement with the trunnion ball. An adapter may include an inner surface and may receive the bearing insert such that the inner surface is in confronting engagement with the outer surface of the bearing insert and the inner surface is positioned between the flanges. A bearing cap may include a cap surface and may be releasably coupled to the adapter such that the bearing cap and the adapter substantially surround the trunnion ball and the cap surface is in confronting engagement with the trunnion ball.

In accordance with yet another aspect of the disclosure, a replaceable bearing insert for a bearing arrangement is provided. The replaceable bearing insert may include a bearing surface including a curvature configured to be complementarily contoured to a trunnion ball. The bearing surface may be configured to be in confronting engagement with the trunnion ball. An outer surface opposite the bearing surface may be configured to be received in confronting engagement with an inner surface of an adapter. A first semi-annular flange may extend radially outwardly beyond the outer surface. A second semi-annular flange may extend radially outwardly beyond the outer surface. The first semi-annular flange and the second semi-annular flange may be configured to extend along a first side and a second side of the adapter, respectively, such that the inner surface of the adapter is positioned between the first semi-annular flange and the second semi-annular flange.

These and other aspects and features of the present disclosure will be more readily understood upon reading the following detailed description when taken in conjunction with the accompanying drawings. Aspects of different embodiments herein described can be combined with or substituted by one another.

DETAILED DESCRIPTION

Figure 1:
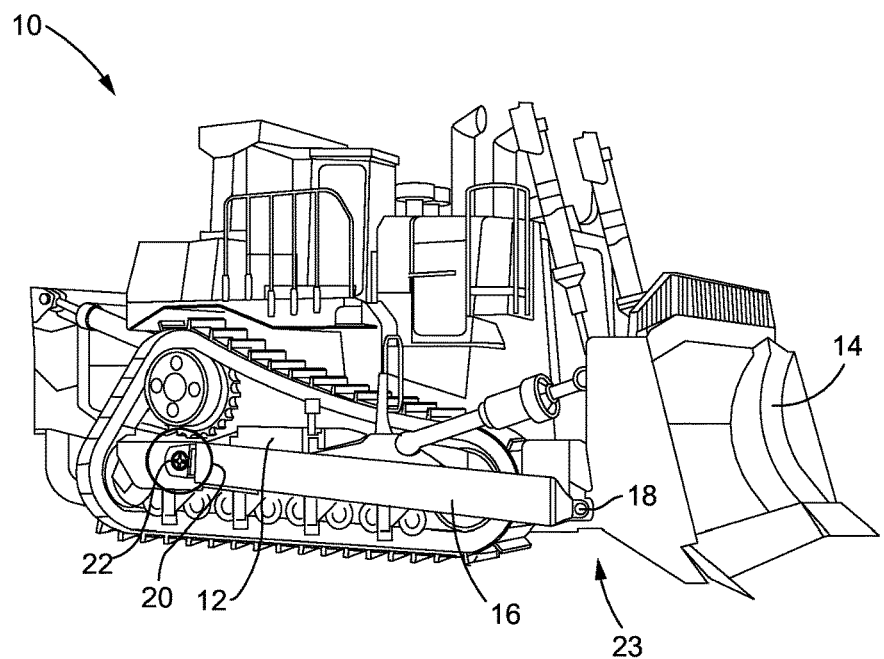
FIG. 1 is a perspective view of an exemplary earth-moving machine, in accordance with an embodiment of the present disclosure.

Referring now to FIG. 1, an exemplary earth-moving machine constructed in accordance with the present disclosure is generally referred to by reference numeral 10. While illustrated as a track-type tractor, it is to be understood that earth-moving machine 10 may be any type of earth-moving machine well known in the industry. The earth-moving machine 10 includes a pair of track roller frames 12 (one shown) with one track roller frame disposed on each side of the earth-moving machine 10. An implement 14 such as, but not limited to, a blade is coupled to the pair of track roller frames 12 via a pair of push arms 16 (one shown). A forward end of each push arm 16 is pivotally coupled to the implement 14 at a pivot connection 18, whereas a rear end of each push arm 16 is pivotally coupled to a respective track roller frame 12 via a bearing arrangement 20 and a trunnion ball 22. The push arm 16 and the implement 14 can be collectively defined as a push arm assembly 23, or dozer assembly and the like, such that the bearing arrangement 20 pivotally supports the push arm assembly 23 with respect to the trunnion ball 22.

Figure 2:
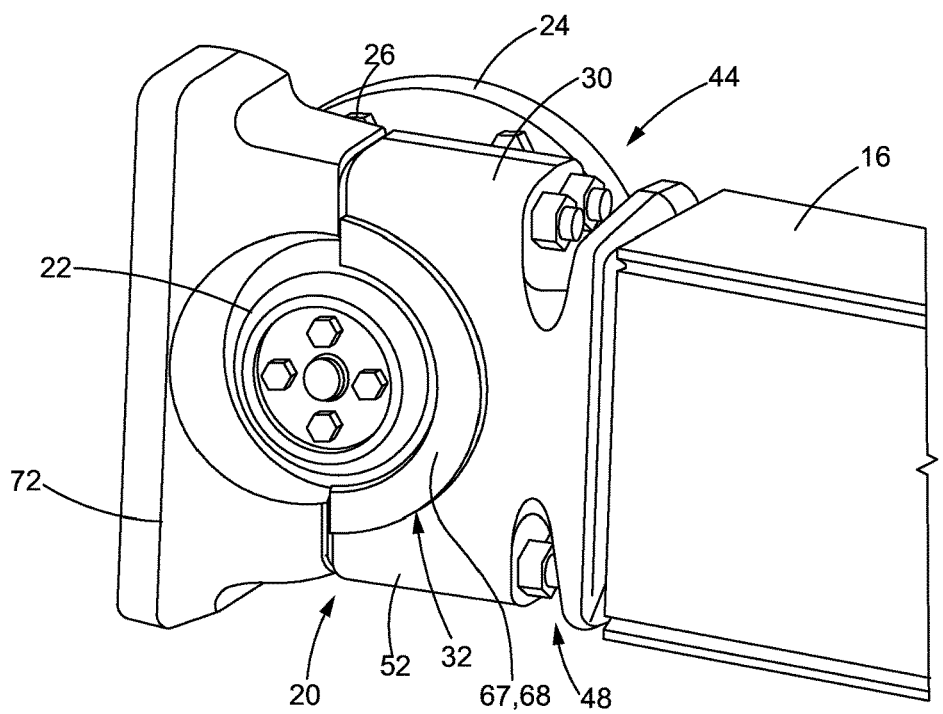
FIG. 2 is an enlarged perspective view illustrating a bearing arrangement, in accordance with an embodiment of the present disclosure.
Figure 3:
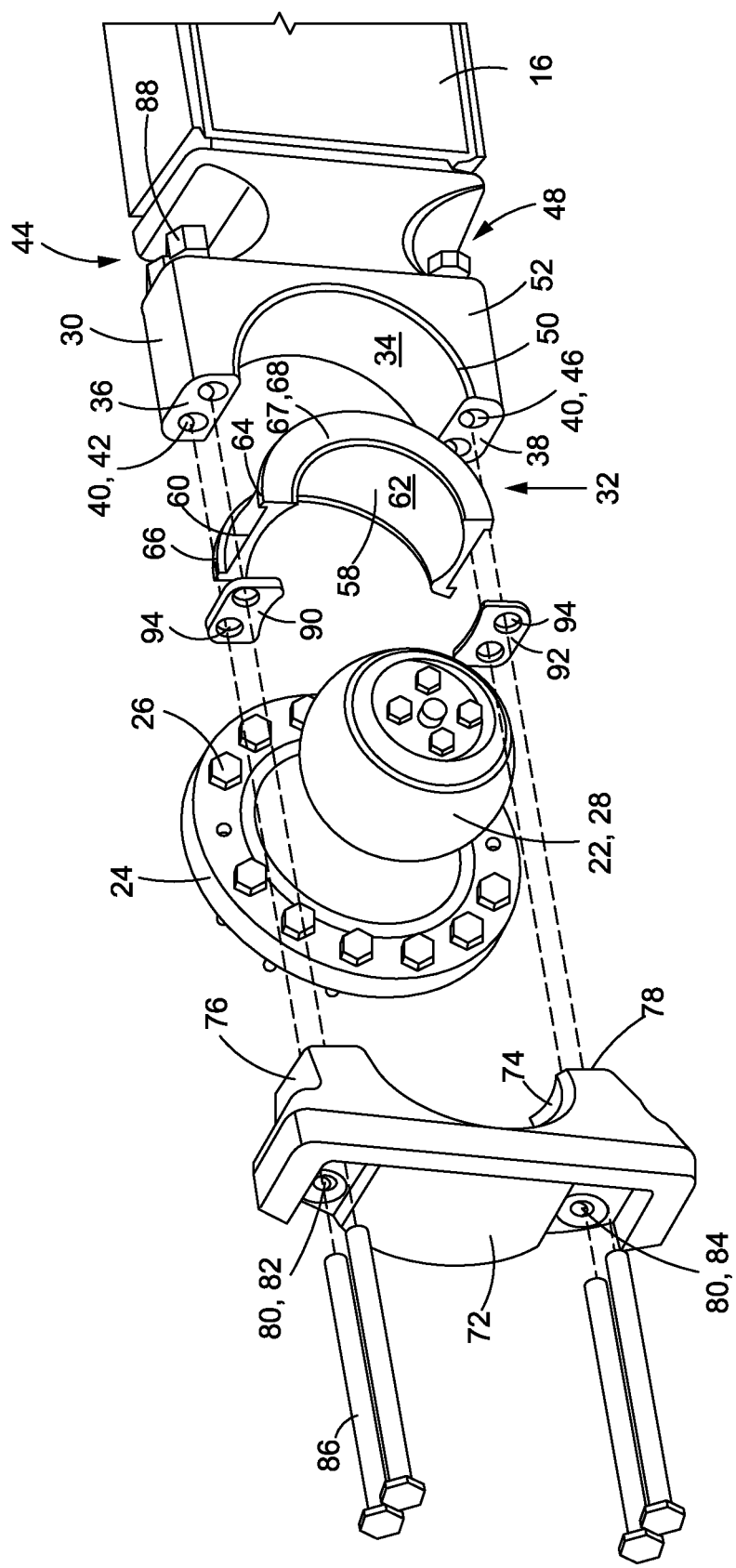
FIG. 3 is an exploded perspective view of FIG. 2, in accordance with an embodiment of the present disclosure.

With reference to FIGS. 1-3, the trunnion ball 22 is coupled to a support plate 24, which is coupled to the track roller frame 12. In an embodiment, the support plate 24 is circular and is coupled to the track roller frame 12 via a plurality of plate fasteners 26 (shown in FIG. 3) such as, but not limited to bolts. The trunnion ball 22 includes a spherical surface 28 (also shown in FIG. 3).

With particular reference to FIGS. 2 and 3, the bearing arrangement 20 includes an adapter 30 and a bearing insert 32. The adapter 30 of the bearing arrangement 20 is coupled to the rear end of the push arm 16 in any manner well known in the art such as, but not limited to, welding. In alternative embodiments, the adapter 30 is integrally disposed on the push arm 16. The adapter 30 includes an inner surface 34 defined therein. In the depicted embodiment, the inner surface 34 is hemi-spherical. The adapter 30 also includes a first adapter interface 36 arranged oppositely from a second adapter interface 38. The adapter 30 includes a plurality of adapter bores 40 such that a first set of adapter bores 42 of the plurality of adapter bores 40 extend from the first adapter interface 36 through the adapter 30 to a first nested slot 44 and a second set of adapter bores 46 of the plurality of adapter bores 40 extend from the second adapter interface 38 through the adapter 30 to a second nested slot 48.

Figure 5:
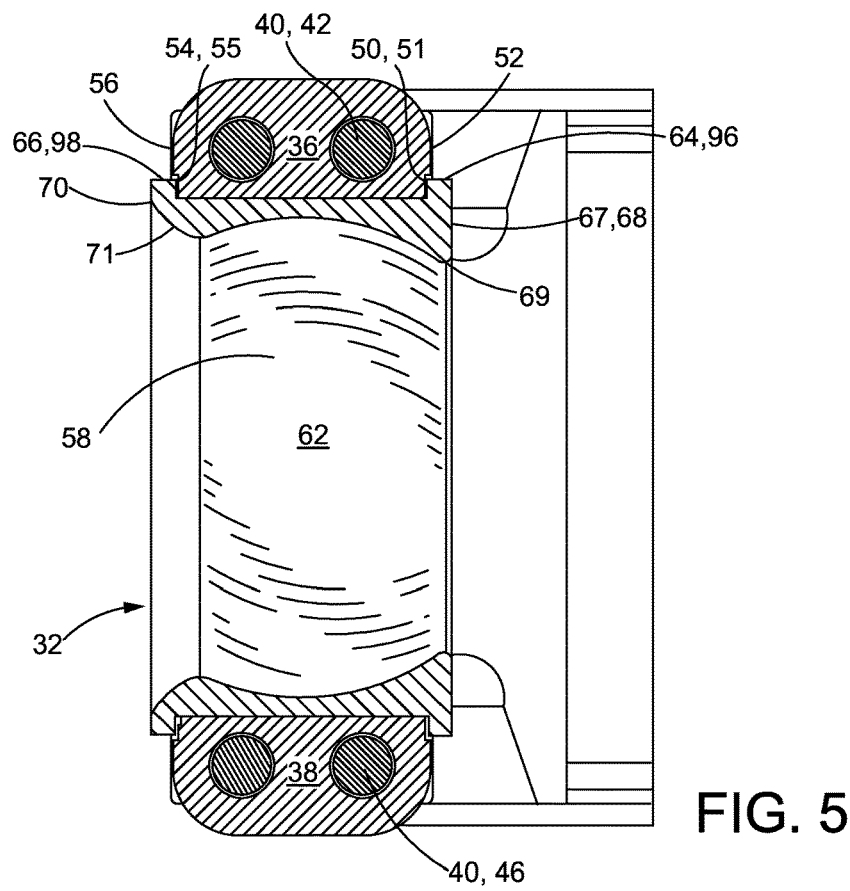
FIG. 5 is rear view of a bearing insert received by an adapter, in accordance with an embodiment of the present disclosure.

As illustrated in FIGS. 3 and 5, a first groove 50 is disposed at a first intersection 51 of the inner surface 34 and a first side 52 of the adapter 30. A second groove 54 is disposed at a second intersection 55 of the inner surface 34 and a second side 56 of the adapter 30. The first and the second grooves 50, 54 trace the arcuate profile of the inner surface 34 of the adapter 30.

Figure 4:
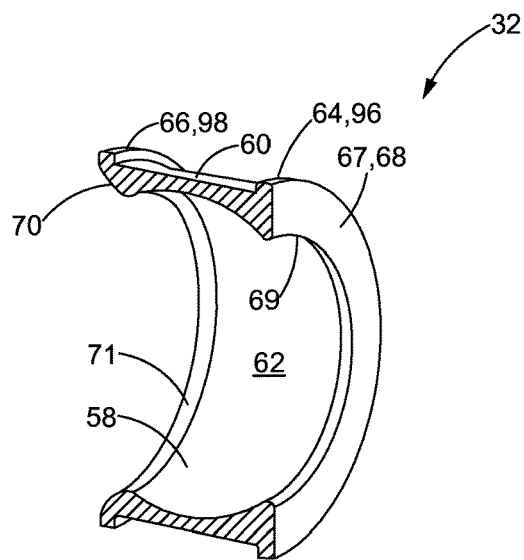
FIG. 4 is a perspective view of a bearing insert, in accordance with an embodiment of the present disclosure.

Referring to FIGS. 3-5, the bearing insert 32 includes a bearing surface 58 oppositely disposed from an outer surface 60. The bearing surface 58 includes a curvature 62 complimentarily contoured to the spherical surface 28 of the trunnion ball 22. For example, the curvature 62 of the bearing surface 58 may be hemi-spherical. The outer surface 60 is complementarily contoured to the inner surface 34 of the adapter 30. The bearing insert 32 also includes a first flange 64 and a second flange 66. The first and the second flanges 64, 66 are semi-annular. The outer surface 60 is disposed between the first and the second flanges 64, 66. Moreover, the first flange 64 is disposed on a first axial end 67 of the bearing insert 32 and extends radially outwardly beyond the outer surface 60. The first axial end 67 includes a planar surface 68 extending radially inwardly from the first flange 64 to a lip 69 of the bearing insert. The second flange 66 is disposed on a second axial end 70 of the bearing insert 32 (shown in FIGS. 4 and 5) and extends radially outwardly beyond the outer surface 60. The second axial end 70 includes a curved surface 71 that transitions radially inwardly from the second flange 66 to the bearing surface 58 of the bearing insert 32.

With reference to FIGS. 2-3 and 5, the bearing insert 32 is removably received by the adapter 30 such that the outer surface 60 of the bearing insert 32 is in confronting engagement with the inner surface 34 of the adapter 30, which is positioned between the first flange 64 and the second flange 66. The bearing insert 32 is C-shaped in the depicted embodiment. Furthermore, with the bearing insert 32 removably inserted into the adapter 30, the first groove 50 of the adapter 30 removably receives the first flange 64 such that the first flange 64 interfaces with the first groove 50 of the adapter 30 and a first exterior surface 96 of the first flange 64 extends laterally outward beyond the first side 52 of the adapter 30. In a similar manner, the second groove 54 of the adapter 30 removably receives the second flange 66 such that the second flange 66 interfaces with the second groove 54 of the adapter 30 and a second exterior surface 98 of the second flange 66 extends laterally outward beyond the second side 56 of the adapter 30. The interfacing of the first and the second flanges 64, 66 with the first and the second grooves 50, 54, respectively, provides resistance to any potential lateral forces which may be applied to the bearing insert 32 and retains the bearing insert 32 in position with respect to the adapter 30.

Moreover, with the bearing insert 32 removably inserted into the adapter 30 and the bearing surface 58 of the bearing insert 32 in confronting engagement with the spherical surface 28 of the trunnion ball 22, a bearing cap 72 is releasably coupled to the adapter 30 such that the bearing surface 58 of the bearing insert 32 is pivotable on the spherical surface 28 of the trunnion ball 22, and the bearing cap 72 and the adapter 30 together substantially surround the trunnion ball 22. The bearing cap 72 includes a cap surface 74 complementarily contoured to the spherical surface 28 of the trunnion ball 22. The cap surface 74 removably receives the spherical surface 28 of the trunnion ball 22. The bearing cap 72 also includes a first cap interface 76 arranged oppositely from a second cap interface 78. The bearing cap 72 includes a plurality of cap bores 80 such that a first set of cap bores 82 of the plurality of cap bores 80 are disposed through the bearing cap 72 to align with the first set of adapter bores 42 and a second set of cap bores 84 of the plurality of cap bores 80 align with the second set of adapter bores 46. A plurality of cap bolts 86 are inserted into the plurality of cap bores 80 and through the plurality of adapter bores 40 such that a plurality of nuts 88 receive the ends of the plurality of cap bolts 86 and are threaded thereto for releasably coupling the bearing cap 72 to the adapter 30 around the trunnion ball 22. In this manner, the plurality of nuts 88 are disposed in the first and the second nested slots 44, 48 for protection from damage thereto.

In some embodiments, a first plurality of shims 90 is disposed between the first adapter interface 36 and the first cap interface 76 and a second plurality of shims 92 is disposed between the second adapter interface 38 and the second cap interface 78. In this manner, the first plurality of shims 90 and the second plurality of shims 92 also include a plurality of shim bores 94 for receiving the plurality of cap bolts 86. The first plurality of shims 90 and the second plurality of shims 92 are arranged to engage the bearing insert 32 to retain the bearing insert 32 from rotating in the adapter 30.

INDUSTRIAL APPLICABILITY

In general, the present disclosure may find applicability with earth-moving applications in any number of industries such as, but not limited to, mining, construction, and agricultural industries. By utilizing the systems and methods disclosed herein, a replaceable bearing insert can be employed in an earth-moving machine such as, but not limited to, a track-type tractor, which may reduce labor time involved in servicing the bearing insert.

For example, as the bearing insert 32 is subjected to heavy loads during operation, the bearing insert 32 may experience wear and may need to be replaced. In some circumstances, the bearing insert 32 may be serviced or replaced in the field at a work site to expedite downtime of the earth-moving machine 10. As such, the bearing cap 72 may be releasably uncoupled from the adapter 30 via the unthreading of the plurality of nuts 88 from the plurality of cap bolts 86. With the bearing cap 72 removed, the bearing insert 32 along with the adapter 30 may be unengaged from the trunnion ball 22. As the first and the second flanges 64, 66 of the bearing insert 32 straddle the first and the second grooves 50, 54 of the adapter 30, the first and the second flanges 64, 66 are configured to facilitate removal of the bearing insert 32 from the adapter 30 due to the flanges 64, 66 being exposed and providing surface area, at the first and second exterior surfaces 96, 98, for which a tool can make contact with to assist in the removal. As such, the bearing insert 32 then can be removed from the adapter 30 by using the tool, such as but not limited to a hammer, to tap on the first and the second flanges 64, 66.

This may be contrasted with the common practice of servicing bearing arrangements that include an insert design fitting into its adapter without any surface area exposed exterior thereto. For example, with the bearing cap removed, labor intensive use of multiple tools (e.g. an air hammer and chisel) may be required for removal of such an insert due to the insert being seized inside of its adapter without any exposed contact area for a tool to apply leverage for extraction. Moreover, the bearing insert 32 of the present disclosure may also provide less labor intensive servicing as compared to common one-piece bearings, which often requires the labor intensive steps of cutting off the heavy one-piece bearing from the push arm and then welding a new one-piece bearing onto the push arm.

Furthermore, while in some embodiments the adapter 30 of the present disclosure is permanently secured or integrally disposed to the push arm 16, in other embodiments the adapter 30 is capable of being retrofitted to existing earth-moving machines. For example, an existing adapter may be cut off its push arm and the adapter 30 may be welded in replacement thereto. With the adapter 30 secured to such a push arm, the bearing insert 32 may also be employed.

Additionally, the bearing insert 32, due to the first and the second flanges 64, 66, may provide more contact area with the spherical surface 28 of the trunnion ball 22, which may reduce contact stress and edge loading, and thus, may improve wear life of both the bearing insert 32 and the trunnion ball 22.

What is claimed is:

1. A replaceable bearing insert for a bearing arrangement, the replaceable bearing insert comprising:
   a bearing surface including a curvature being configured to be complementarily contoured to a trunnion ball, the bearing surface configured to be in confronting engagement with the trunnion ball;
   an outer surface opposite the bearing surface, the outer surface configured to be received in confronting engagement with an inner surface of an adapter;
   a first semi-annular flange extending radially outwardly beyond the outer surface; and
   a second semi-annular flange extending radially outwardly beyond the outer surface, the first semi-annular flange and the second semi-annular flange being configured to extend along a first side and a second side of the adapter, respectively, such that the inner surface of the adapter is positioned between the first semi-annular flange and the second semi-annular flange,
   wherein the first semi-annular flange is disposed on a first axial end of the bearing insert and the second semi-annular flange is disposed on a second axial end of the bearing insert,
   wherein the replaceable bearing insert is asymmetrical in a rear view showing the bearing surface, the replaceable bearing insert including a lip at a first interface between the first axial end and the bearing surface, and a curved surface at a second interface between the second axial end and the bearing surface, the lip having a first radius of curvature and the curved surface having a second radius of curvature greater than the first radius of curvature, and the lip extending radially inward more than the curved surface.

2. The replaceable bearing insert of claim 1, wherein the first axial end of the bearing insert includes a planar surface extending radially inwardly from the first flange to the lip of the bearing insert and the second axial end of the bearing insert includes to the curved surface that transitions radially inwardly from the second flange to the bearing surface of the bearing insert.

3. The replaceable bearing insert of claim 1, wherein the first semi-annular flange is configured to be received by a first groove of the adapter and the second semi-annular flange is configured to be received by a second groove of the adapter.

4. The replaceable bearing insert of claim 1, wherein each of the outer surface and the bearing surface is entirely smooth.

5. A bearing arrangement for pivotally supporting a push arm assembly with respect to a trunnion ball of a machine, the bearing arrangement comprising:
   an adapter including an inner surface, the adapter being configured to be coupled to a bearing cap such that the coupled adapter and bearing cap substantially surround the trunnion ball; and
   a bearing insert including a bearing surface, an outer surface opposite the bearing surface, and a pair of flanges, the outer surface disposed between the flanges, a first flange and a second flange of the pair of flanges being configured to extend along a first side and a second side of the adapter, respectively, the first and second sides forming outermost sides of the adapter, wherein
   the bearing insert being configured to be received by the adapter such that the bearing surface is in confronting engagement with the trunnion ball, the outer surface is in confronting engagement with the inner surface of the adapter,
   the inner surface of the adapter is positioned between the flanges and the bearing insert has a thickness from a first axial end to a second axial end greater than a thickness of the adapter from the first side to the second side thereof such that the first flange extends from the first side of the adapter and the second flange extends from the second side of the adapter when the bearing insert is received by the adapter; and
   wherein the bearing insert is asymmetrical in a rear view showing the bearing surface, the bearing insert including a lip at a first interface between the first axial end and the bearing surface, and a curved surface at a second interface between the second axial end and the bearing surface, the lip having a first radius of curvature and the curved surface having a second radius of curvature greater than the first radius of curvature, and the lip extending radially inward more than the curved surface.

6. The bearing arrangement of claim 5, wherein the pair of flanges are semi-annular, the first flange of the pair of flanges being disposed on the first axial end of the bearing insert and extending radially outwardly beyond the outer surface, and the second flange of the pair of flanges being disposed on the second axial end of the bearing insert and extending radially outwardly beyond the outer surface.

7. The bearing arrangement of claim 6, the adapter further including a first groove disposed at a first intersection of the inner surface of the adapter and the first side of the adapter and a second groove disposed at a second intersection of the inner surface of the adapter and the second side of the adapter, wherein the first groove receives the first flange and the second groove receives the second flange.

8. The bearing arrangement of claim 6, wherein the first axial end of the bearing insert includes a planar surface extending radially inwardly from the first flange to the lip of the bearing insert and the second axial end of the bearing insert includes the curved surface that transitions radially inwardly from the second flange to the bearing surface of the bearing insert.

9. The bearing arrangement of claim 5, wherein the bearing surface of the bearing insert includes a curvature complementarily contoured to a spherical surface of a trunnion ball and the bearing surface adapted to operatively receive the spherical surface for pivotal movement.

10. An earth-moving machine, comprising:
a track roller frame;
a support plate coupled to the track roller frame;
a trunnion ball coupled to the support plate;
a bearing insert including a bearing surface, an outer surface opposite the bearing surface, and a pair of flanges, the outer surface disposed between the flanges, the bearing surface in confronting engagement with the trunnion ball;
an adapter including an inner surface, the adapter receiving the bearing insert such that the inner surface is in confronting engagement with the outer surface of the bearing insert and the inner surface is positioned between the flanges; and
a bearing cap including a cap surface, the bearing cap releasably coupled to the adapter such that the bearing cap and the adapter substantially surround the trunnion ball and the cap surface is in confronting engagement with the trunnion ball, wherein
a first flange and a second flange of the pair of flanges are configured to extend along a first side and a second side of the adapter, respectively, the first and second sides forming outermost sides of the adapter,
the bearing insert has a thickness from a first axial end to a second axial end greater than a thickness of the adapter from the first side to the second side thereof such that the first flange extends from the first side of the adapter and the second flange extends from the second side of the adapter when the bearing insert is received by the adapter; and
wherein the bearing insert is asymmetrical in a rear view showing the bearing surface, the bearing insert including a lip at a first interface between the first axial end and the bearing surface, and a curved surface at a second interface between the second axial end and the bearing surface, the lip having a first radius of curvature and the curved surface having a second radius of curvature greater than the first radius of curvature, and the lip extending radially inward more than the curved surface.

11. The earth-moving machine of claim 10, wherein the pair of flanges are semi-annular, the first flange of the pair of flanges being disposed on the first axial end of the bearing insert and the second flange of the pair of flanges being disposed on the second axial end of the bearing insert.

12. The earth-moving machine of claim 11, wherein the first flange and the second flange extend radially outwardly beyond the outer surface.

13. The earth-moving machine of claim 12, the adapter further including a first groove disposed at a first intersection of the inner surface of the adapter and the first side of the adapter and a second groove disposed at a second intersection of the inner surface of the adapter and the second side of the adapter, wherein the first groove receives the first flange and the second groove receives the second flange.

14. The earth-moving machine of claim 13, wherein the first axial end of the bearing insert includes a planar surface extending radially inwardly from the first flange to the lip of the bearing insert and the second axial end of the bearing insert includes the curved surface that transitions radially inwardly from the second flange to the bearing surface of the bearing insert.

15. The earth-moving machine of claim 14, wherein the adapter is coupled to a push arm.

16. The earth-moving machine of claim 14, wherein the adapter is integrally disposed on a push arm.

17. The earth-moving machine of claim 14, wherein the adapter includes a plurality of adapter bores, the bearing cap includes a plurality of cap bores aligned with the plurality of adapter bores, and a plurality of cap bolts extend through the plurality of cap bores and the plurality of adapter bores for releasably securing the bearing cap to the adapter via threading of a plurality of nuts to ends of the plurality of cap bolts.

18. The earth-moving machine of claim 17, further including a plurality of shims releasably secured at interfaces between the bearing cap and the adapter, the plurality of shims arranged to retain the bearing insert from rotating in the adapter.

19. The earth-moving machine of claim 18, wherein the plurality of shims include a plurality of shim bores for receiving the plurality of cap bolts.

* * * * *